United States Patent [19]

Matsuhisa et al.

[11] Patent Number: 4,713,206
[45] Date of Patent: Dec. 15, 1987

[54] PROCESS FOR DEWAXING CERAMIC MOLDED BODIES

[75] Inventors: Tadaaki Matsuhisa, Kasugai; Shingo Sasaki, Kuwana, both of Japan

[73] Assignee: NGK Insulators, Ltd., Japan

[21] Appl. No.: 707,680

[22] Filed: Mar. 4, 1985

[30] Foreign Application Priority Data

Mar. 16, 1984 [JP] Japan .................................. 59-52030

[51] Int. Cl.⁴ ...................... B29C 71/02; C04B 35/64
[52] U.S. Cl. .................................. 264/328.2; 264/63; 264/67; 264/344
[58] Field of Search ...................... 264/344, 63, 328.2, 264/67

[56] References Cited

U.S. PATENT DOCUMENTS 4,404,166  9/1983  Wiech .................................. 264/63
4,460,527  7/1984  Kato .................................... 264/63

FOREIGN PATENT DOCUMENTS 793957  1/1981  U.S.S.R. .............................. 264/344

Primary Examiner—James Derrington
Attorney, Agent, or Firm—Parkhurst & Oliff

[57] ABSTRACT

A process for dewaxing a ceramic molded body is disclosed, the process includes heating an injection molded body made from ceramic material and a wax-series binder, said heating occurring upon a porous ceramic body.

12 Claims, 2 Drawing Figures

PROCESS FOR DEWAXING CERAMIC MOLDED BODIES

BACKGROUND OF THE INVENTION

1. Field of the Invention

This invention relates to a process for dewaxing a ceramic molded body, and more particularly to a process for dewaxing an injection molded body placed upon a porous ceramic.

2. Description of the Prior Art

Silicon ceramics such as silicon nitride, silicon carbide, sialon and the like; alumina ceramics, zirconia ceramics and so on are stable at elevated temperatures, as compared with metallic materials, and are hardly subjected to oxidation corrosion and creep deformation, so that they are heavily studied to be utilized as engine parts.

In order to mold turbine rotors and the like having complicated shapes among the engine parts, an injection molding process is preferable and is widely utilized. However, such an injection molding process has the greatest fault in the dewaxing step. For this reason, there are proposed various processes for producing a thick molded body without cracking during dewaxing.

There has been generally known placing a molded body after injection molding on a base plate made of an alumina ceramic or the like and the temperature thereof is slowly raised in an electric furnace to gradually remove a binder from the molded body. However, when a wax-series binder is used as the binder, cracks occur from the bottom face of the molded body which contacts with the base plate, which frequently results in poor dewaxing.

SUMMARY OF THE INVENTION

It is, therefore, an object of the invention to prevent the occurrence of dewaxed cracks, which occur in the prior art, in the dewaxing of an injection molded body made from a ceramic material and a wax-series binder.

According to the invention, there is provided in a process for dewaxing a ceramic molded body by heating an injection molded body made from a ceramic material and wax-series binder, the improvement being said injection molded body being heated while located on a porous ceramic.

In a preferred embodiment of the invention, a honeycomb ceramic is used as the porous ceramic and the dewaxing is effected by machining the honeycomb ceramic at its opening side so as to match with a shape of the bottom face of the molded body, contacting the machined honeycomb ceramic with the bottom face of the molded body, and holding the heating temperature in a range of $-10°$ C. to $+50°$ C., with respect to the melting point of the wax, until the extruding phenomenon does not occur.

DETAILED DESCRIPTION OF THE INVENTION

Figure 1:
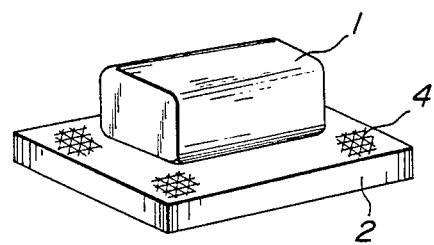
FIG. 1 is a perspective view illustrating a dewaxing state of a rectangular molded body placed on a porous ceramic according to the invention.

The invention will be described in greater detail with respect to the construction in the process for dewaxing ceramic molded bodies.

A ceramic powder of silicon nitride, silicon carbide, sialon, alumina, zirconia or the like is added and thoroughly mixed with sintering aids such as $Y_2O_3$, MgO, CaO, $ZrO_2$, $CeO_2$, SrO, BeO, B, C and the like to prepare a homogeneous mixture. Then, this mixture is kneaded with binders such as wax, plasticizer and the like under heating to prepare a ceramic starting material for injection molding. Thereafter, the ceramic starting material is injection-molded to obtain a ceramic molded body. The injection molded body thus obtained is placed on a porous ceramic, which is machined in accordance with the shape of the bottom face of the molded body so as not to bear a deflective load, and then dewaxed by heating in a hot air circulating type electric furnace to remove the binders such as wax, plasticizer and the like, which have been included in the molded body. In this case, the heating conditions are dependent upon the type and amount of the wax, plasticizer and the like, but the heating is usually carried out under such conditions that the temperature is slowly raised from room temperature and held at a temperature promoting the exuding of the wax or in a range of $-10°$ C. to $+50°$ C. with respect to the melting point of the wax for several hours and further raised at a rate of not more than 100° C./hr up to 500° C., preferably not more than 10° C./hr up to 300° C.

The dewaxing process according to the invention is effective when the binder consists mainly of paraffin wax, microcrystalline wax or the like capable of causing the exuding.

In general, the wax has a very large volume expansion from solid phase to liquid phase and exhibits a maximum volume change at a temperature within a range of 10° C. lower than its melting point. Therefore, when heating the molded body using the wax-series binder, there results an exuding phenomenon that the wax is liquefied about the melting point to exude from the surface of the molded body. The exuded wax moves along the surface of the molded body and collects on the base plate located beneath the bottom face of the molded body.

Since the porous ceramic is used as the base plate according to the invention, the liquefied wax can rapidly be absorbed by the base plate, so that the decomposition and volatilization of the wax can smoothly proceed after its exudation.

As mentioned later, when alumina ceramics or the like are used as the base plate, the wax collected beneath the bottom face of the molded body is not absorbed by the base plate, so that the violent degradation of the molded body occurs from the wax contacting portion during the decomposition and volatilization of the wax to finally cause the cracking at the bottom face of the molded body.

The porous ceramic to be used in the invention can be made of any ceramic having a characteristic capable of efficiently absorbing the exuded wax, among which a honeycomb ceramic is most preferable.

Particularly, the use of the honeycomb ceramic is effective when a hot air circulating type electric furnace is used for the dewaxing of the molded body. By contacting the opening side of the honeycomb ceramic with the bottom face of the molded body, dewaxing is uniformly carried out because hot air is circulated by convection to the bottom face of the molded body through the openings of the honeycomb ceramic.

Moreover, it is important that the surface of the honeycomb ceramic contacting with the bottom face of the molded body is machined in accordance with the shape of the bottom face so as not to bear a deflective load. In this case, the machining is necessary to add the volume expansion of the wax as previously mentioned.

As the electric furnace used in the dewaxing of the molded body, a hot air circulating type electric furnace is preferable. The dewaxing of the molded body is completed with the decomposition and volatilization of the wax-series binder after the exuding. Therefore, when hot air is circulated by convection to the surface of the molded body in the furnace, the dewaxing proceeds very efficiently and the occurrence of dewaxed cracks is minimal. Moreover, the dewaxing is important to be carried out within a temperature range of $-10°$ C. to $+50°$ C. with respect to the melting point of the wax until the exuding phenomenon does not result. Because, the exuding phenomenon is rare outside the above defined temperature range and the effect using the dewaxing process according to the invention is small.

The following examples are given in illustration of the invention and are not intended as limitations thereof.

EXAMPLE 1

To 100 parts by weight of SiC powder consisting mainly of $\beta$-phase SiC and having an average particle size of 0.5 $\mu$m were added 3 parts by weight of $B_4C$ and 2 parts by weight of C as a sintering aid to obtain a SiC mixture for pressureless sintering. This mixture was kneaded with 15% by weight of paraffin wax and 2% by weight of stearic acid under heating to prepare a ceramic starting material for injection molding. The ceramic starting material was injection-molded to form four rectangular molded bodies 1 each having a size of 25 mm width $\times$ 100 mm length $\times$ 25 mm height as shown in FIG. 1. Then, two base plates 2, each made of a honeycomb ceramic according to the invention, and two base plates each made of the conventional alumina ceramic were provided, on each of which was placed the molded body 1. Thereafter, these assemblies were placed in a hot air circulating type electric furnace and heated from 40° C. to 75° C. at a rate of 10° C./hr and held at 75° C. for 5 hours. When the inside of the electric furnace was observed from a peephole after 3 hours at 75° C. it was confirmed that exuding was promoted by exuding of the wax from the surface at 75° C. molded body 1. After 5 hours of the, an assembly A, using the honeycomb base plate according to the invention, and an assembly B, using the conventional alumina base plate, were taken out from the electric furnace and the surface of each of these assemblies was observed visually. As a result, the stained region corresponding to about 2 times the size of the bottom face of the molded body was found in the honeycomb base plate, according to the invention, as shown in Table 1, which showed that the exuded wax was absorbed sufficiently. Furthermore, the dewaxing ratio of the molded body as measured from the following equation was 10%:

$$\text{Dewaxing ratio (\%)} = \frac{A - B}{A} \times \frac{1}{C} \times 100$$

wherein A is the weight of the molded body before dewaxing, B is the weight of the molded body after dewaxing and C is the amount of the binder (%).

On the contrary, only the stained region corresponding in size to approximately the bottom face of the molded body was found in the conventional alumina base plate and the absorption of the exuded wax was small. Moreover, the dewaxing ratio was 1.5%.

Then, the assembly was dewaxed by heating to 500° C. at a rate of 10° C./hr and held at 500° C. for 5 hours. Upon the observation of the assemblies A and B after the dewaxing, it was confirmed that there were no cracks in the molded body A using the honeycomb base plate according to the invention, while the cracks were existent in the bottom face of the molded body B using the conventional alumina base plate, as shown in Table 1.

TABLE 1

| | Molded body taken out at 75° C. | | |
|---|---|---|---|
| | Stained region of base plate | Dewaxing ratio of molded body (%) | Molded body after dewaxing |
| Assembly A according to the invention | about 2 times the bottom face of molded body | 10 | no crack |
| Conventional assembly B | region was slightly wider than the bottom face | 1.5 | cracks occurred in the bottom face |

EXAMPLE 2

Figure 2:
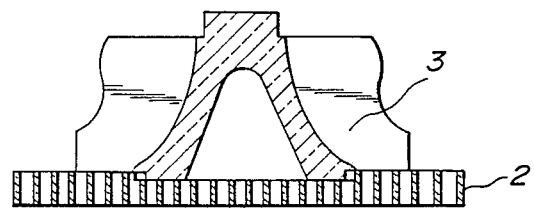
FIG. 2 is a sectional view of an application example of the porous ceramic according to the invention for dewaxing a ceramic turbine rotor unit.

To 100 parts of $Si_3N_4$ powder having an average particle size of 1 $\mu$m were added 2 parts of SrO, 3 parts of MgO and 3 parts of $CeO_2$ as a sintering aid to obtain an $Si_3N_4$ mixture for pressureless sintering. This mixture was kneaded with 5% of EVA resin and 15% of polyethylene wax under heating to prepare a ceramic starting material for injection molding. Then, the ceramic starting material was injection-molded in a mold for the manufacture of a radial type turbine rotor unit having a maximum diameter of 50 mm in the blade portion thereof sintering, to obtain a blade portion 3 as shown in FIG. 2. Then, the blade portion 3 was placed on a honeycomb ceramic 2, having been machined at its opening side so as to match with the shape of the bottom face of the blade portion, and placed in a hot air circulating type electric furnace, where the blade portion was heated from 40° C. to 100° C. at a rate of 5° C./hr and held at 100° C. for 8 hours.

Thereafter, the dewaxing was carried out by heating up to 400° C. at a rate of 10° C./hr and holding at this temperature for 5 hours. After the dewaxing, no cracking was observed in the blade portion 3.

As mentioned above, in the process for dewaxing ceramic molded bodies according to the invention, the occurrence of cracks in the dewaxed body is prevented by heating the injection molded body made from ceramic material and wax-series binder while located upon the porous ceramic, so that the invention has industrial merits as compared with the conventional dewaxing process for the ceramic molded body.

What is claimed is:

1. A process for dewaxing a ceramic molded body comprising:

forming an injection molded ceramic body, said ceramic body containing a wax-series binder;

placing said molded body upon a honeycomb ceramic body; and heating said molded ceramic body to remove said wax-series binder therefrom.

2. The process according to claim 1, wherein said binder consists essentially of an exuding binder selected from the group consisting of paraffin waxes and microcrystalline waxes.

3. The process according to claim 1, wherein said honeycomb ceramic body contacts with a bottom face of said molded body.

4. The process according to claim 3, wherein the surface of said honeycomb ceramic body is machined so as to match with the shape of a bottom face of said molded body.

5. The process according to claim 1, wherein said ceramic molded body comprises a turbine rotor unit for a turbocharger.

6. The process according to claim 1, wherein said heating is performed in a hot air circulating-type electric furnace and said dewaxing is effected by holding said electric furnace at a temperature within a range of $-10°$ C. to $+50°$ C. of the melting point of the wax-series binder until a wax exuding phenomenon does not occur.

7. A process for dewaxing a ceramic molded body comprising:

forming an injection molded ceramic body, said ceramic body containing a wax-series binder;

placing said molded body upon a honeycomb ceramic body, said honeycomb ceramic body contacting a bottom face of said molded body; and heating said molded body in a hot air circulating-type electric furnace to remove said wax-series binder therefrom.

8. The process according to claim 7, wherein said binder consists essentially of an exuding binder selected from the group consisting of paraffin waxes and microcrystalline waxes.

9. The process according to claim 7, wherein a top surface of said honeycomb ceramic body is machined so as to match with the shape of the bottom face of said molded body.

10. The process according to claim 7, wherein said ceramic molded body comprises a turbine rotor unit for a turbocharger.

11. The process according to claim 7, wherein said dewaxing occurs at a temperature within a range of $-10°$ C. to $+50°$ C. of the melting point of the wax-series binder until a wax exuding phenomenon does not occur.

12. A process for dewaxing a ceramic molded body comprising:

forming an injection molded ceramic body, said ceramic body containing an exuder binder selected from the group consisting of paraffin waxes and microcrystalline waxes;

placing said molded body upon a ceramic honeycomb body, a bottom surface of said molded body contacting with a machined top portion of said honeycomb ceramic body such that the bottom portion of said molded body matches with the machined top portion of said honeycomb ceramic body; and heating said molded ceramic body in a hot air circulating-type electric furnace to dewax said ceramic molded body, said dewaxing being effected at a temperature within a range of $-10°$ C. to $+50°$ C. of the melting point of the wax-series binder until a wax exuding phenomenon does not occur.

* * * * *